(12) United States Patent
Lieberman et al.

(10) Patent No.: US 7,338,160 B2
(45) Date of Patent: Mar. 4, 2008

(54) CONTACT LENS WITH SHAPED PERIPHERY

(75) Inventors: David M. Lieberman, New York, NY (US); Jonathan Grierson, Atwater, OH (US)

(73) Assignee: Scientific Optics, Inc. c/o Avalon Ventures, La Jolla, CA (US)

( * ) Notice: Subject to any disclaimer, the term of this patent is extended or adjusted under 35 U.S.C. 154(b) by 8 days.

(21) Appl. No.: 10/558,509

(22) PCT Filed: May 27, 2004

(86) PCT No.: PCT/US2004/016977

§ 371 (c)(1),
(2), (4) Date: May 1, 2006

(87) PCT Pub. No.: WO2004/109368

PCT Pub. Date: Dec. 16, 2004

(65) Prior Publication Data

US 2006/0268225 A1 Nov. 30, 2006

Related U.S. Application Data

(60) Provisional application No. 60/474,845, filed on May 30, 2003.

(51) Int. Cl.
*G02C 7/04* (2006.01)
(52) U.S. Cl. .................. 351/160 R; 351/177
(58) Field of Classification Search ............ 351/160 R, 351/160 H, 161, 177
See application file for complete search history.

(56) References Cited

U.S. PATENT DOCUMENTS 2,264,080 A 11/1941 Hunter
3,212,097 A 10/1965 Adler
3,495,899 A * 2/1970 Biri ................. 351/160 R
4,861,152 A * 8/1989 Vinzia et al. ............. 351/161
4,872,876 A 10/1989 Smith
5,114,628 A 5/1992 Hofer et al.
5,430,504 A * 7/1995 Muckenhirn et al. ....... 351/161
5,436,678 A * 7/1995 Carroll ..................... 351/161
5,502,518 A 3/1996 Lieberman
5,570,142 A 10/1996 Lieberman
5,724,120 A * 3/1998 Svochak et al. ........... 351/161
5,953,098 A 9/1999 Lieberman et al.
6,149,609 A 11/2000 Lieberman et al.
6,340,229 B1 1/2002 Lieberman et al.
6,416,179 B1 7/2002 Lieberman et al.

FOREIGN PATENT DOCUMENTS

EP 0618474 10/1994
WO 973418 9/1997

OTHER PUBLICATIONS

Supplementary European Search Report dated Feb. 9, 2007 for PCT/US2004/016977.

* cited by examiner

*Primary Examiner*—Scott J. Sugarman
*Assistant Examiner*—Darryl J. Collins
(74) *Attorney, Agent, or Firm*—Joseph B. Lerch; Kaplan Gilman Gibson & Dernier LLP

(57) ABSTRACT

Eye measurements taken on a patient being fitted for contact lens will include a refraction test and an additional measurement representing corneal depth variation on the surface of an imaginary cylinder having the same diameter as the lens. This information then used during lens manufacture to produce lens in which the perimeter is not circular and does not lie in a plane, but which drops backwards towards the eye at appropriate points to produce a saddle-shaped perimeter.

33 Claims, 6 Drawing Sheets

CONTACT LENS WITH SHAPED PERIPHERY

This patent application claims the benefit of the filing date of U.S. Provisional Patent Application No. 60/474,845 filed May 30, 2003. This patent application is the U.S. national stage of International Application No. PCT/US04/16977 which designated the United States and was published in English as WO 2004/109,368 on Dec. 16, 2004.

FIELD OF THE INVENTION

The present invention relates generally to contact lenses and to methods of manufacturing contact lenses, and in particular to asymmetric, aspheric contact lenses and methods of manufacture thereof.

BACKGROUND AND SUMMARY OF THE INVENTION

Thirty to forty percent of the human population under age 40 develop an ocular refractive error requiring correction by glasses, contact lenses, or surgical means. Refractive errors result when the primary optical elements of the eye, the cornea and the lens, fail to image incoming light directly on the retina. If the image is focused in front of the retina, myopia (nearsightedness) exists. If the eye image is focused behind the retina, hyperopia (farsightedness) exists. The focusing power of the eye or any of the eye's individual components is measured in units called diopters.

Approximately 20% of the patients under 40 having vision defects cannot wear contact lenses because the contact lenses do not fit (become dislodged and/or are very uncomfortable), or they fail to provide the requisite optical correction, or both. In addition, many patients who currently wear contact lenses are not satisfied with the length of time they can wear their lenses and/or with the visual acuity their contact lenses provide.

Over age 40, the percentage of the population requiring vision correction dramatically increases because the crystalline lens of the eye becomes relatively inelastic. With increasing age the quality of the tear film decreases as well as the rate of lid blink that causes some previously successful contact lens wearers such discomfort that they may abandon their lenses.

Contact lenses are customarily described as "corneal" wherein the lens is of such diameter that it rests purely on the corneal surface and "soft" wherein the lens is extended beyond the cornea to rest on the adjacent sclera. Standard contact lenses are rotationally symmetrical and the optical portion of the lens is composed of simple Guass optics, i.e., either a simple sphere or a toric. In the case of "soft" contact lenses vault the cornea as the lens rests on that portion of the eye peripheral to the cornea, i.e . . . the sclera, and vault from the sclera. The human cornea and sclera, however, are "asymmetrically aspheric" surfaces.

"Aspheric" means that the radius of curvature along a corneal "meridian" (which is an imaginary line on the corneal surface passing through the geometric center of the cornea, analogous to a geographic meridian) is not a constant. Indeed, the corneal curvature tends to flatten progressively from the geometric center to the periphery. "Asymmetric" means that the profile of the corneal curvature along a half-meridian is not the same as (i.e., it is not a mirror image of) the other half of the same meridian. Additionally, "asymmetric" means that the profile of the corneal curvature about a central point (i.e., an origin) is not the same as the corneal profile on the opposite side of the central point. The degree to which the cornea is aspheric and/or asymmetrical varies from patient to patient and within the same person.

Current state of the art contact lenses do not match the corneal curvature and geometry, and therefore do not fit properly. The more irregular the patient's cornea the worse the fit, such that about 20% of the patients under age 40 are unable to wear standard contact lenses.

In addition, standard contact lenses are rotationally symmetrical. Sometimes the fitter will generate toric, bitoric and like surfaces in his effort to fit lenses on the cornea. These more complicated lens designs remain inherently rotationally symmetric, i.e., the surfaces are generated about a central point of revolution.

Because the human cornea has an asymmetrically aspheric surface, purely Gauss based lenses poorly match the corneal curvature and geometry. When the lens is designed as a toric lens, the resultant lens surfaces remain rotationally symmetrical (i.e., these lenses are not asymmetrical and aspheric). In some eyes the discrepancy between the lens and underlying cornea's asymmetry is so great that toric lenses fail to center on the cornea and/or give satisfactory vision.

In an effort to alleviate these problems, manufacturers developed lenses with varying curvatures on their posterior surface. For example, U.S. Pat. No. 5,114,628 discloses aspherical contact lenses made using corneal topographic data to control a lathe. (The data, as taught in the '628 patent, provide information on the slope of the corneal surface at different points on the cornea and are based on measurements in two dimensions, interpreted three-dimensionally.) The resultant lens is aspherical (in both the anterior and posterior surface) but inherently symmetrical.

U.S. Pat. No. 2,264,080 to Hunter discloses a system for manufacturing a "contoured" scleral contact lens, i.e., a lens resting outside and intentionally vaulting the cornea. Hunter teaches the creation of a mold of the surface of the eye which is then used as a "template" to mechanically radially guide a grinder over the surface of a lens blank.

Accordingly, there is a need in the art for a better fitting contact lens that will decrease or eliminate the number of patients of all ages who currently cannot wear contact lenses, and provide better comfort for patients who now wear contact lenses.

U.S. Pat. Nos. 5,502,518 and 5,570,142 both to Lieberman and Grierson, which are assigned to the same Assignee as the present invention, are both directed to contact lenses that have posterior surfaces that accurately match at least a portion of the surface of the cornea. The '518 and '142 patents satisfied the need for better fitting contact lens.

U.S. Pat. No. 5,953,098 to Lieberman and Grierson, which is assigned to the present assignee, provides a further refinement of the '518 and '142 patents and provides increased acuity by dividing the surface of the lens into a plurality of segments, each of which has a relatively small surface area so that, particularly in the lens' optical region, the posterior surface of the lens will more closely conform to or match the surface of the underlying cornea resulting in negation of the lens effect of the tear film and, hence, improved acuity.

In U.S. Pat. No. 6,340,229 to Lieberman and Grierson, assigned to the assignee of the present invention, a contact lens is designed which includes a central optical portion and a transition portion radially outward of the central portion and overlying the cornea, which is conformed to the local geometry of the underlying portion of the cornea, including corneal tilt and distortion. In a soft contact lens, a scleral skirt is also provided and the transition portion connects the central optical portion and the scleral skirt.

The disclosures of U.S. Pat. Nos. 5,502,518; 5,570,142; 5,953,098 and 6,340,229 are hereby incorporated by reference in their entirety. In the case of inconsistencies, the present description, including definitions, will control.

Although significant improvement in comfort resulted from the inventions of the patents identified in the preceding paragraph, they necessitated the creation of custom lenses, which requires special equipment and skill to analyze the cornea and design the lense. Such lenses are therefore relatively expensive, and the large majority of lens wearers do not wear them. Instead, they wear contact lenses that are prescribed by an eye care professional on the basis of a conventional eye refraction test and a further measurement which determines the lens required to vault the cornea. Such lenses will hereafter be referred to as "prescription" lenses. Patients continue to have difficulty in wearing prescription contact lenses, particularly for extended periods of time. Patients with certain corneal defects, such as keratoconus, were often even not able to maintain prescription contact lenses in their eyes. That is, the lense centers poorly or in some cases dislodges from the eye.

In an effort to improve lens comfort by reducing the foreign body sensation caused by the lid/cornea interface, many patients now wear soft contact lenses. However, these lenses have not reached their potential for comfort for the same reasons already discussed. In addition, with soft lenses, the mismatch shape between the lens periphery and the eye also results in flexure of the lens, which has a deleterious effect on visual acuity producing frank blurring of vision.

As a result of analysis of such patient difficulties, by utilizing surface modeling methods disclosed in U.S. Pat. No. 6,149,609 and No. 6,416,179, the present inventors have discovered that the peripheral portion of the prescription contact lens accounted for these problems. Prescription lenses are typically formed on a lathe, and the periphery is round and generally lies in a plane. Since the cornea is aspherical and asymmetric at all diameters, a poor fit results particularly at the periphery of the lens. It is a goal of the present invention to improve the fit of prescription contact lenses to permit a greater proportion of the population to wear them comfortably.

In accordance with the present invention, eye measurements taken on a patient being fitted for contact lenses will include an additional measurement representing corneal depth variation on the surface of an imaginary cylinder having the same diameter as the lens. This information can then be used by a lens manufacturer to produce lens in which the perimeter is not circular and does not lie in a plane, but which drops backwardly towards the eye at the appropriate points to produce a saddle-shaped perimeter.

BRIEF DESCRIPTION OF THE DRAWINGS

The foregoing brief description, as well as other, features and advantages of the present invention will be understood more fully from the following description of presently preferred, but nonetheless illustrative, embodiments with reference being had to the accompanying drawings, in which.

DETAILED DESCRIPTION OF PREFERRED EMBODIMENTS

Figure 1:
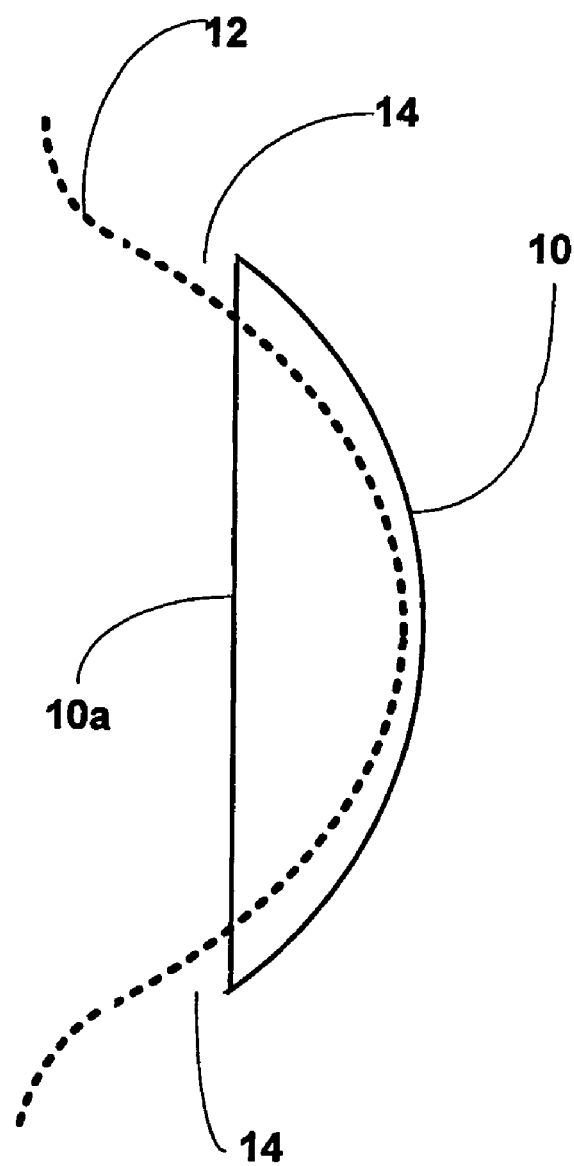
FIG. 1 is a side view of an eye showing a conventional prescription contact lens being worn.

Referring now to FIG. 1, there is illustrated a side view of a conventional contact lens 10 as worn on the eye 12 of a patient. The periphery 10a of lens 10 is circular and generally lies in a plane. However, the cornea is asymmetric and aspheric, and it is flatter in its lateral dimension than its vertical dimension. Accordingly, there are spaces 14 (shown exaggerated) between the edge of the lens and the eye at the top and bottom. As a result of these spaces, lens 10 tends to rock vertically when subjected to the movement of the eyelids. Lens movement causes irritation of the eye and, therefore, discomfort to the wearer.

Figure 2:
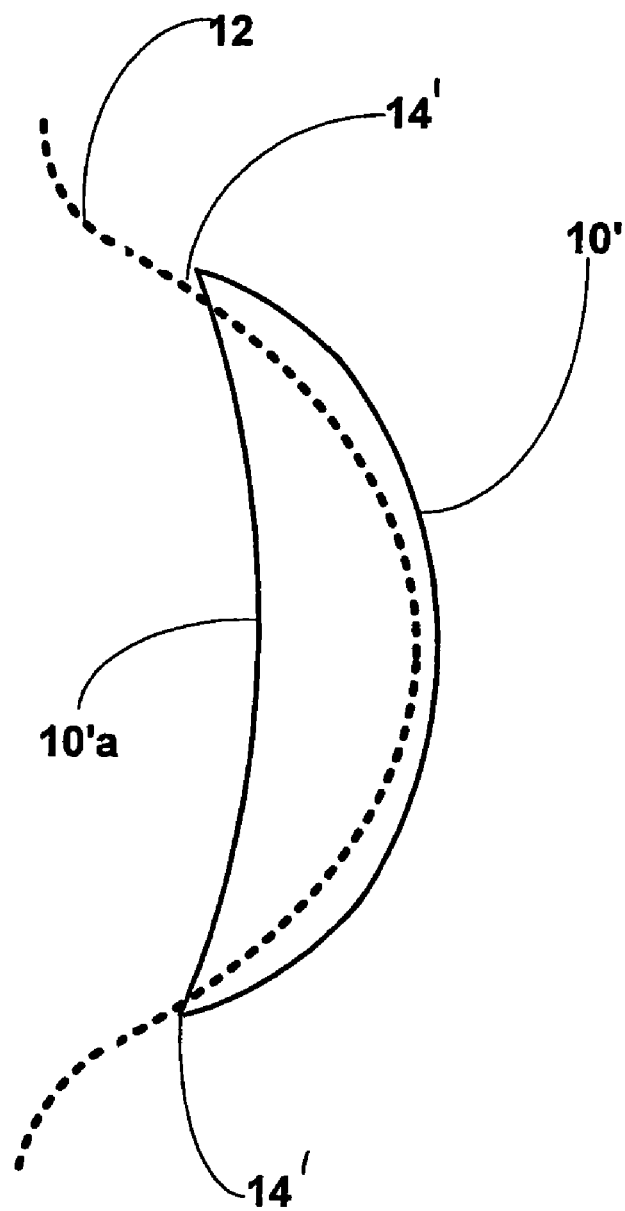
FIG. 2 is a view similar to FIG. 1, showing a prescription contact lens embodying the present invention.

As illustrated in FIG. 2, in accordance with the present invention, the peripheral shape of lens 10 is modified so its edges are drawn closer to the eye in the region of spaces 14, 14 resulting in lens 10'. In effect, the distance or depth of the edge of the lens from a plane tangent to the apex of the eye is increased in the region of spaces 14, 14. At the same time, the depth of the lens edge at a point half-way between the spaces 14, 14 (in FIG. 1), and the shape of the lens edge from that center point to the spaces 14, 14 is varied smoothly. This results in a lens periphery 10a' which no longer lies in a plane, but is moderately saddle-shaped. With this modified peripheral shape, the lens sits closer to the eye along its entire periphery 10a'. In particular, the spaces 14, 14 are substantially reduced or eliminated. This results in eliminating the rocking motion of the lens under the influence of eyelid movement, which relieves the accompanying eye discomfort. It will be appreciated that the lens must assume a predetermined rotational orientation in the ey. This commonly achieved by adding a weight at the lower edge of the lens.

Prescription contact lens seek to correct the patient's vision in accordance with the required corrections established in a "refraction test." When this test is performed, the patient sits in chair which is fitted with a special device called a "phoropter", through which the patient looks at an eye chart approximately 20 feet away. As the patient looks into the phoropter, the doctor manipulates lens of different strengths into view and, each time, asks the patient whether the chart appears more or less clear with the particular lens in place. In practice, the doctor is able to vary the power or diopter correction about two orthogonal axes, as well as the degree of rotation of those axes about a Z-axis along the line-of-sight. The doctor continues to modify these three parameters until he achieves the optimum vision. The results of the refraction test are usually given in the form "a, b, c°", where "a" is the diopter correction at the first axis, "b" is the additional diopter correction required at the second, orthogonal axis, and "c°" is the angle of rotation of the first axis relative to the horizontal. This form of information is given for each eye and is immediately useful in grinding a pair of lens for eyeglasses.

However, the conventional refraction test does not provide sufficient information to produce a prescription contact lens. It is also necessary to provide information regarding the amount of depth variation in the eye from its apex to the region underlying the periphery of the lens. This measurement is typically obtained with a simple topographic scanning machine of the "placido disk" type. One example of this type of device is the EyeSys of EyeSys, Inc. of Houston, Texas. This measurement permits the physician to describe an available appropriate height for the lens to permit it to vault the cornea. For example, with a lens shaped like a spherical cap, this merely amounts to selecting the radius of curvature and the diameter of the lens.

Figure 3:
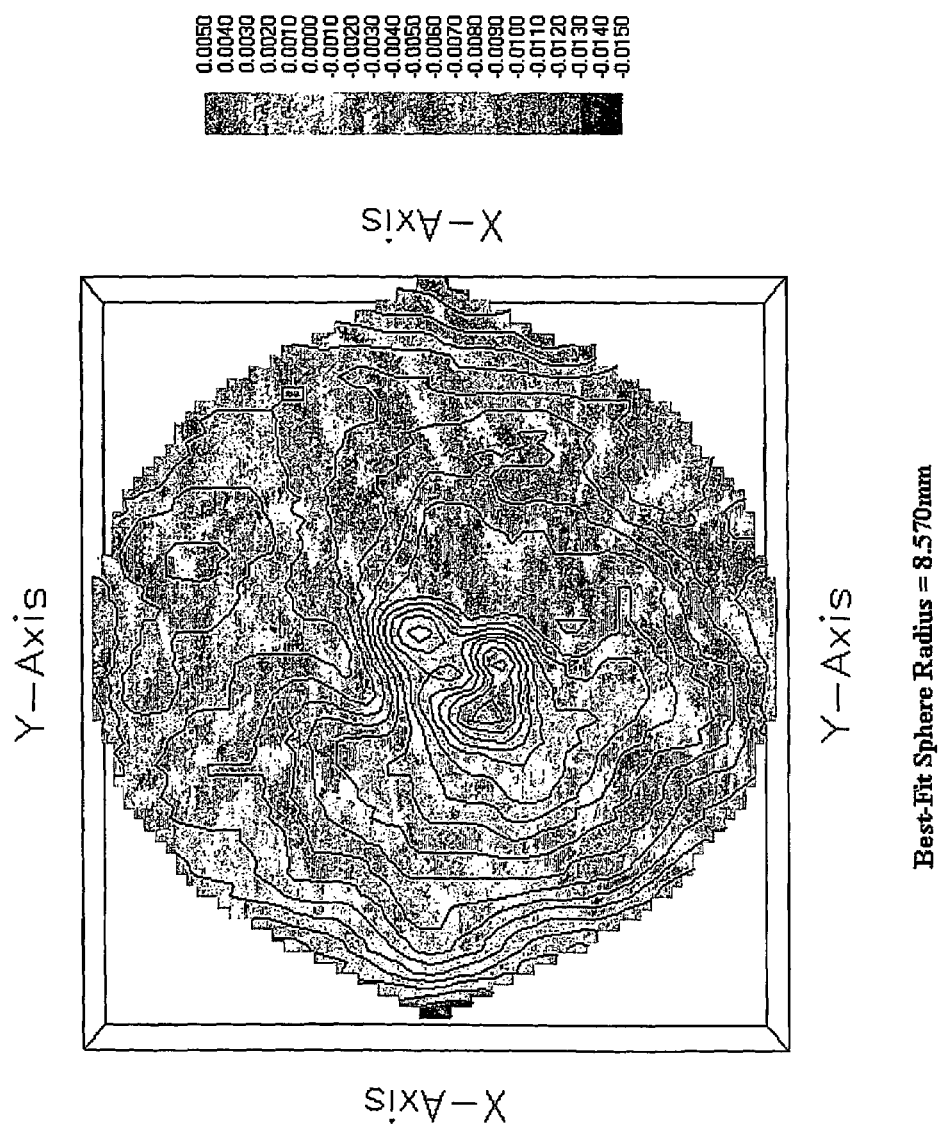
FIG. 3 illustrates a typical scan diagram produced by a placido disk topographical scanner.

FIG. 3 illustrates the type of display obtained with a modern topographic rastersterography based scanner. The display represents the corneal depth at a plurality of different rings (disks) in a plan view of the cornea as seen from the front. It should be appreciated that this display is in color and that the scale at the side of the display correlates each of the color regions to the amount that that ring deviates from the best fit sphere. In this case, the cornea has been measured out to a 7 mm diameter and the best fit sphere has been found to be one having an 8.570 mm radius.

Even a minimally equipped eye care professional will have an old fashioned keratometer or a single ring Placido device. Such a device gives an indication of the "K" or central curvature of the cornea. It is a common practice of conventional contact lens design to use the flatest K as an indication of the lens diameter, for example in accordance with Table I.

TABLE I

Contact Lens Diameter

| Flatest K (mm) | Diameter (mm) |
|---|---|
| less than 39.75 | 9.5 |
| 40-43 | 9.3 |
| 43.25-44.50 | 9.1 |
| 44.75-46.00 | 9.0 |
| 46.25-48.00 | 8.9 |
| 48.25 and greater | 8.8 |

Figure 4:
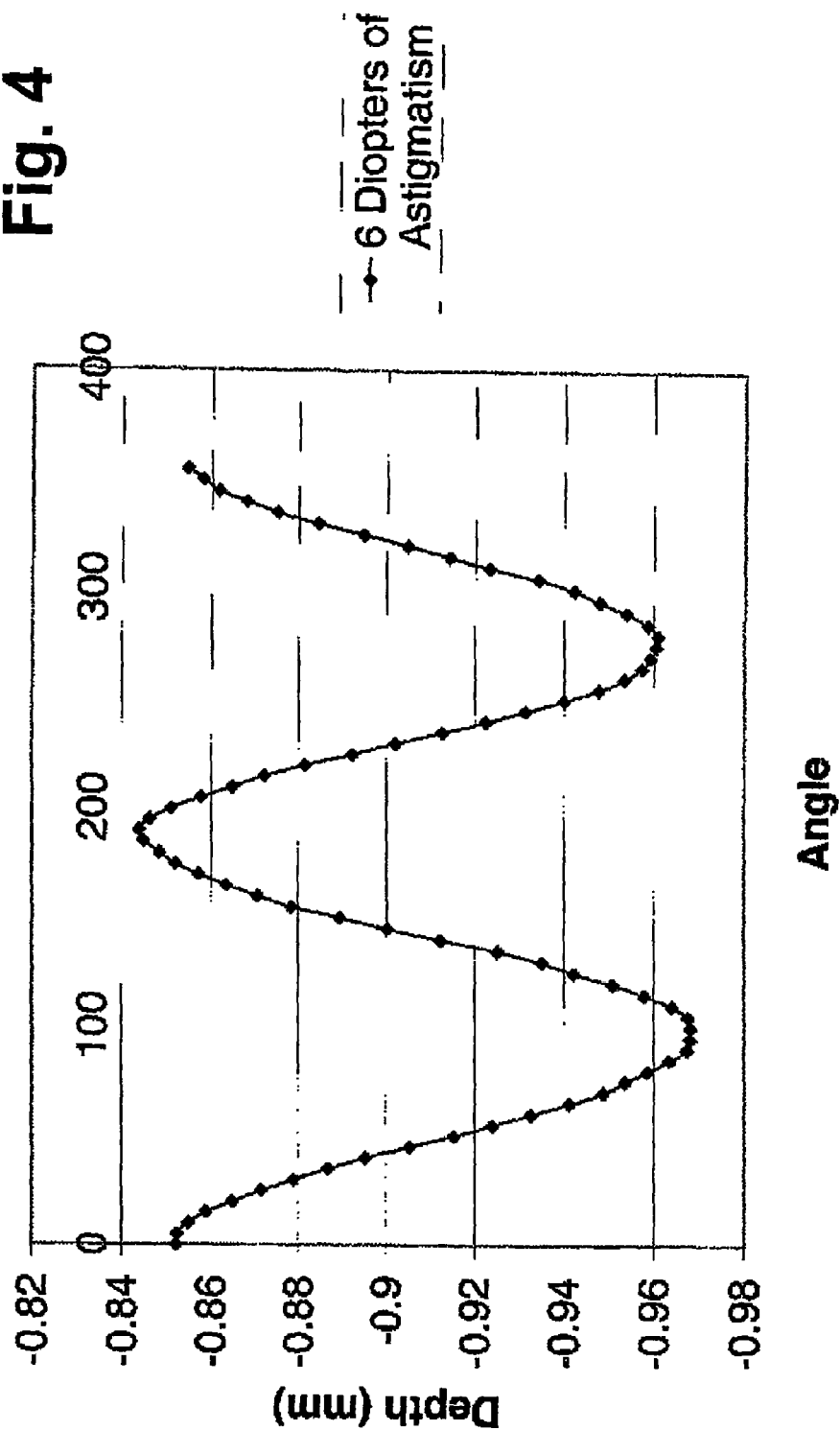
FIG. 4 is a graph illustrating peripheral depth variation of a representative cornea with angular displacement about the cornea.

As result of analyses of patients' corneas utilizing the surface modeling methods disclosed in U.S. Pat. Nos. 6,149,609 and 6,416,179, the disclosures of which are incorporated herein by reference in their entirety, characteristics of human eyes have been discovered which are useful in designing lens with saddle-shaped peripheries. For example, FIG. 4 is a graph illustrating the depth of a cornea at various points along a sphere of diameter 7 mm projected onto the eye. The Y axis represents the corneal depth and the X axis the angular displacement about the sphere. In this case, zero degrees is assumed to be the most inferior point on the sphere. As can be seen in the figure, this eye has 6 diopters of a stigmatism. The depth varies from approximately 0.84 mm to 0.96 mm and exhibits a substantially sinusoidal variation with angular displacement. The shallowest points on the sphere occur at approximately 0° and 180° and the deepest at approximately 90° and 270°. Also, the depth is greater in the vicinity of 90° than the vicinity of 270°. This type of depth characteristics is quite typical.

Figure 5:
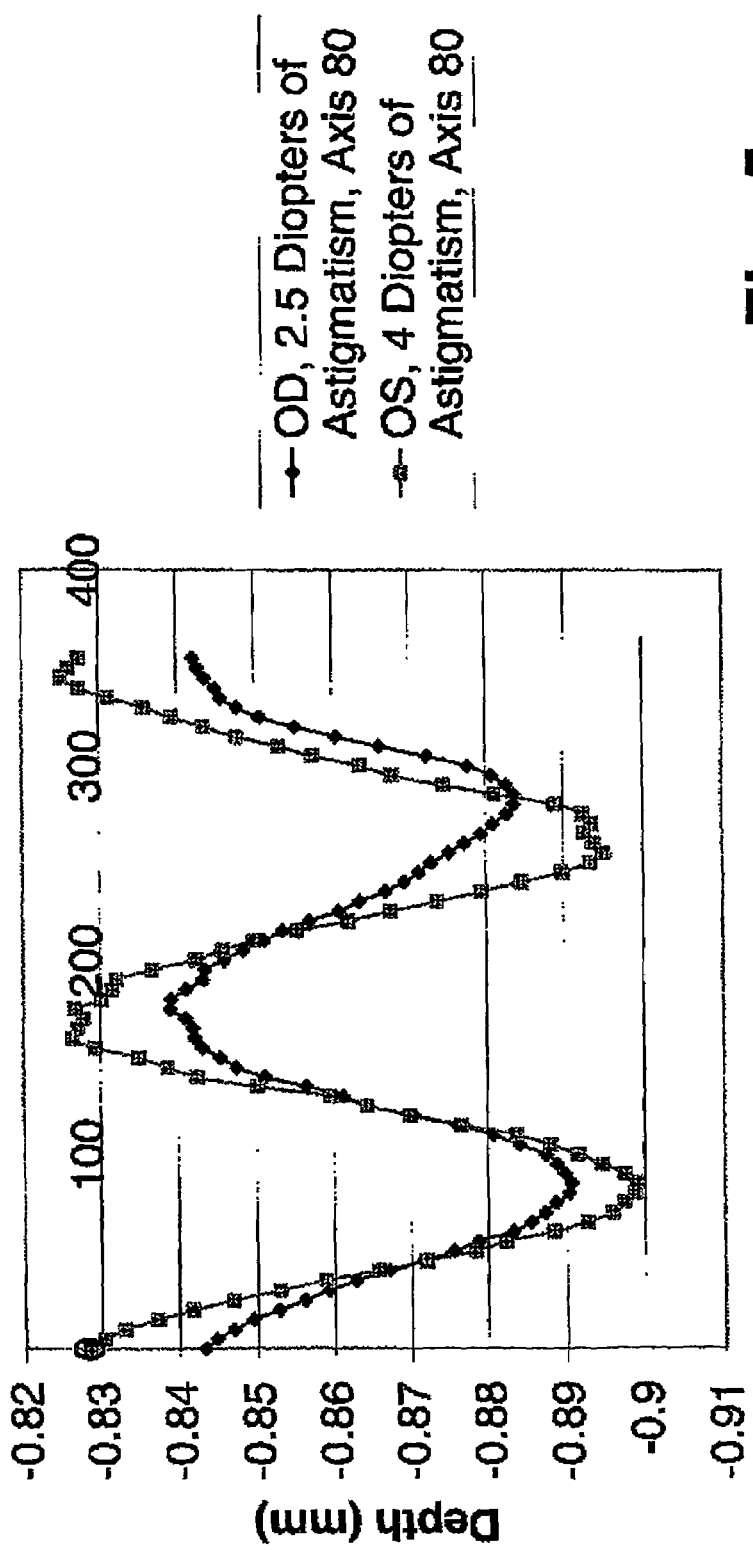
FIG. 5 is a graph similar to FIG. 4 showing both corneas of a patient.

In FIG. 5 another characteristic is presented, similar to FIG. 4, this time showing both eyes of a patient. In this case, the dominate eye (OD) has 2.5 diopters of astigmatism at axis 80° (showing a depth variation from about 0.84-0.89 mm), and the non-dominate eye (OS) has 4 diopters of a stigmatism at axis 80° (showing a depth variation of about 0.83-0.9 mm). Again both eyes have a substantially sinusoidal characteristic, but additional features are disclosed here. First of all, the depth variation at a specified disameter changes with the amount of astigmatism. Also, the dominate eye tends to exhibit less astigmatism.

Empirical measurement has deduced the relationship illustrated in Table II between astigmatism and required vertical depth increase of the lens.

TABLE II

Lens Depth Adjustment

| Astigmatism (diopters) | Vertical Depth Increase (μm) |
|---|---|
| 2 | 40 |
| 3 | 60 |
| 4 | 75 |
| 6 | 130 |

Thus, the amount that the upper and lower portions of a contact lens will need to be brought towards the eye for a prescription lens can reasonably be deduced from an astigmatism determination. As an approximation or "rule of thumb", the maximum lens depth can be increased by 20 μm per diopter of astigmatism. When ordering prescription lens, a doctor can therefore specify the astigmatism of the eye and its axis and be assured of obtaining a far better fitting lens than previously.

Traditionally, lathing techniques have not been adequate to shape lens blanks asymmetrically in three dimensions because they did not have the accuracy or precision of an encoded miller. However, modern lathes, for example, lathes sold under the trade name of Optiform Lathe™, made by Rank, Taylor, Hobson Ltd. of Leicester, England, have the accuracy and precision of an encoded miller and can cut a lens blank in the Z direction of about 0.1 mm, at least for every 15° interval rotational segment of the lens surface.

The astigmatism or similar information provided by the doctor can then be used by the lens manufacturer to program the lathes so as to increase the depth of the lens at the appropriate points and to vary their perimeters smoothly back to the 0° and 180° points.

The present invention encompasses soft, hard or gas-permeable contact lens made without limitation from a variety of commercially available materials, such as hydrophilic polymers (e.g., hydrogels), poly(methyl methacrylate), or rigid gas-permeable polymeric materials such as fluoro-silicone acrylate (Polymer Technology), flexible fluoro polymers (e.g., A-FPP from Ocular Sciences), siloxane acrylate (CooperVision), styrisilicone (Ocutec), 1-butyl styrene/silicone acrylate (PBH), polysulfone-fluoro silicone acrylate (Progressive Optical Research) and fluoropolymer (American Hydron) which are preferred.

The phenomenon observed with respect to FIG. 1, the flatter shape of the corneal surface laterally as compared with its shape vertically, has a more pronounced effect as the diameter of the lens increases. In addition, vertical assymetry becomes more pronounced as the diameter of the lens increases so that it extends to and beyond the sclera. The depth characteristic still resembles FIG. 4, except the second downward peak, becomes substantially smaller, disappears or becomes an upward peak. That is, the size of the upper gap 14 increases as the diameter of the lens increases and the lower gap 14 tends to decrease substantially. Since soft contact lens extend peripherally beyond the sclera they are of greater diameter than hard contact lens, so the phenomenon observed with respect to FIG. 1 is more pronounced.

On the other hand, it would be desirable to minimize the amount of customization and to manufacture the lens with conventional lathes in order to reduce the cost of the lens. This become particularly desirable with certain types of soft lens such as disposable lens.

Figure 6:
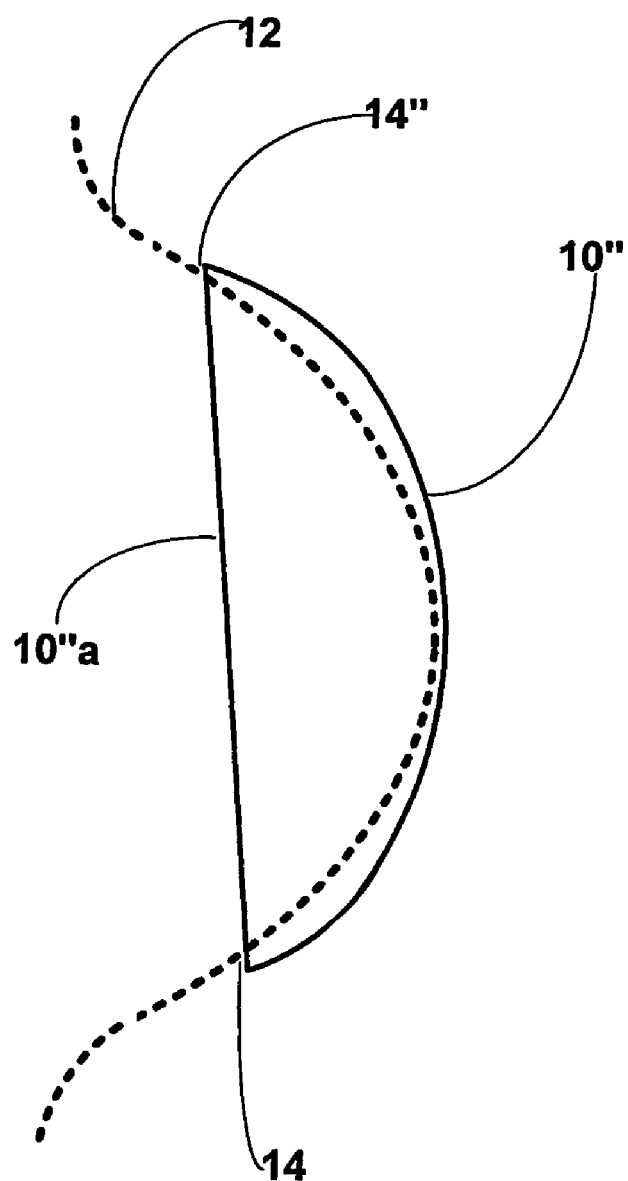
FIG. 6 is a view similar to FIG. 2 illustrating a second form of contacr lens embodying the present invention.

In accordance with a second embodiment of the invention, a lens is manufactured with a periphery that lies in a plane, but the plane of the periphery is non-parallel to or tilted with respect to a plane tangent to the apex of the lens. Preferably, the tilt is such as to bring the upper edge of the lens closer to the surface of the eye, when worn. Consequently, the upper gap 14" is reduced while the planar periphery permits the lens to be manufactured by conventional lathes. Such a lens 10" is illustrated in FIG. 6, as worn in the eye. It will be appreciated that since the shape of the eye is such that is closer to the lower edges of the lens at this diameter, no shape change is necessary at the lower edge of the lens.

To further reduce the cost of the lens, it is not customized in peripheral shape. Instead, the tilt of the plane of the periphery is selected to bring the upper edge of the lens closer to the eye by a fixed amount determined to be a statistical average. For example, the upper edge of the lens could be brought closer by approximately 80 μm. This would bring improved comfort and less corneal drying and the clinical consequences thereof to a substantial portion of the lens wearing population of minimum expense.

Having thus described preferred embodiments of the present invention, it is to be understood that the above described devices and methods are merely illustrative of the principles of the present invention, and that other devices may be devised by those skilled in the art by making additions, modifications or substitutions, without departing from the spirit and scope of the invention.

What is claimed:

1. A method for manufacturing an optical lens to improve fit in the human eye, the lens having a body with a vaulted, curved shape with an apex and a periphery, the method comprising the step of shaping the periphery so that portions thereof in the vicinity of first meridian are at a different distance from a plane tangent to the apex than portions thereof in the vicinity of a second meridian which is rotationally offset from the first meridian by 90°.

2. A method for manufacturing an optical lens to improve fit in the human eye, the lens having a body with a vaulted, curved shape with an apex and a periphery, the method comprising the steps of shaping the periphery so that portions thereof are at different distances from a plane tangent to the apex wherein the periphery is shaped so that when the lens is in the eye, portions of the periphery in the vicinity of a horizontal meridian are closer to the plane than portions of the periphery in the vicinity of a vertical meridian.

3. The method of claim 2, wherein the periphery is shaped so that, when the lens is in the eye, portions of the periphery in the vicinity of the top of a vertical meridian are further from the plane than portions of the periphery in the vicinity of the bottom of a vertical meridian.

4. The method of claim 2 or 3, wherein the periphery is shaped so that, when the lens is worn in the eye, the difference in the distance from the plane of points in the vicinity of a horizontal meridian and points in the vicinity of a vertical meridian is related to the amount of astigmatism exhibited by the eye.

5. The method of claim 4, wherein the periphery is shaped so that the difference in distance is about 20 μm for each diopter of astigmatism.

6. The method of claim 4, wherein the lens is a contact lens.

7. The method of claim 4, wherein the lens is a soft contact lens.

8. The method of claim 4, wherein the lens is a prescription lens.

9. The lens of claim 4 wherein the periphery of the lens lies in a second plane which is tilted with respect to the tangent plane.

10. The lens of claim 9, wherein the tilt is the same in every lens and is calculated to bring a portion of the lens periphery closer by a predetermined amount to the surface of the eye in which it is worn.

11. The method of any one of claims 1-3, wherein the lens is a contact lens.

12. The method of any one of claims 1-3, wherein the lens is a soft contact lens.

13. The method of any one of claims 1-3, wherein the lens is a prescription lens.

14. The lens of any one of claims 1-3 wherein the periphery of the lens lies in a second plane which is tilted with respect to the tangent plane.

15. The lens of claim 14, wherein the tilt is the same in every lens and is calculated to bring a portion of the lens periphery closer by a predetermined amount to the surface of the eye in which it is worn.

16. The lens of claim 15, wherein the predetermined amount is approximately 80 μm.

17. An optical lens having improved fit in the human eye, the lens having a body with a vaulted, curved shape with an apex and a periphery, the periphery being shaped so that portions thereof in the vicinity of first meridian are at a different distance from a plane tangent to the apex than portions thereof in the vicinity of a second meridian which is rotationally offset from the first meridian by 90°.

18. An optical lens having improved fit in the human eye, the lens having a body with vaulted, curved shape with an apex and a periphery, the periphery being shaped so that portions thereof are at different distances from a plane tangent to the apex, wherein the periphery is shaped so that, when the lens is in the eye, portions of the periphery in the vicinity of a horizontal meridian are closer to the plane than portions of the periphery in the vicinity of a vertical meridian.

19. The lens of claim 18, wherein the periphery is shaped so that when the lens is in the eye, portions of the periphery in the vicinity of the top of a vertical meridian are further from the plane than portions of the periphery in the vicinity of the bottom of a vertical meridian.

20. The lens of claim 18 or 19, wherein the periphery is shaped so that, when the lens is worn in the eye, the difference in the distance from the plane of points in the vicinity of a horizontal meridian and points in the vicinity of a vertical meridian is related to the amount of astigmatism exhibited by the eye.

21. The lens of claim 20, wherein the periphery is shaped so that the difference in distance is about 20 μm for each diopter of astigmatism.

22. The lens of claim 20, wherein the lens is a contact lens.

23. The lens of claim 20, wherein the lens is a soft contact lens.

24. The lens of any one of claim 20, wherein the lens is a prescription lens.

25. The lens of claim 20, wherein the periphery of the lens lies in a second plane which is tilted with respect to the tangent plane.

26. The method claim 25, wherein the tilt is the same in every lens and is calculated to bring a portion of the lens periphery closer by a predetermined amount to the surface of the eye in which it is worn.

27. The method of claim 25, wherein the predetermined amount is approximately 80 μm.

28. The lens of any one of claims 17-19, wherein the lens is a contact lens.

29. The lens of any one of claims 17-19, wherein the lens is a soft contact lens.

30. The lens of any one of claims 17-19, wherein the lens is a prescription lens.

31. The lens of any one of claims 17-19 wherein the periphery of the lens lies in a second plane which is tilted with respect to the tangent plane.

32. The method claim 31, wherein the tilt is the same in every lens and is calculated to bring a portion of the lens periphery closer by a predetermined amount to the surface of the eye in which it is worn.

33. The method of claim 32, wherein the predetermined amount is approximately 80 μm.

* * * * *